United States Patent
Humphrey et al.

(10) Patent No.: US 7,464,025 B2
(45) Date of Patent: Dec. 9, 2008

(54) AUTOMATED SYSTEM AND METHOD FOR GENERATING REASONS THAT A COURT CASE IS CITED

(75) Inventors: Timothy L. Humphrey, Kettering, OH (US); Xin Allan Lu, Springboro, OH (US); Afsar Parhizgar, Dayton, OH (US); Salahuddin Ahmed, Miamisburg, OH (US); James S. Wiltshire, Jr., Springboro, OH (US); John T. Morelock, Beavercreek, OH (US); Joseph P. Harmon, Centerville, OH (US); Spiro G. Collias, Springboro, OH (US); Paul Zhang, Springboro, OH (US)

(73) Assignee: Lexis-Nexis Group, Miamisburg, OH (US)

(*) Notice: Subject to any disclaimer, the term of this patent is extended or adjusted under 35 U.S.C. 154(b) by 703 days.

(21) Appl. No.: 11/056,200

(22) Filed: Feb. 14, 2005

(65) Prior Publication Data

US 2005/0149524 A1 Jul. 7, 2005

Related U.S. Application Data

(62) Division of application No. 09/468,785, filed on Dec. 21, 1999, now Pat. No. 6,856,988.

(51) Int. Cl.
*G06F 17/27* (2006.01)
(52) U.S. Cl. ............... 704/9; 707/2; 707/3; 707/4; 707/5
(58) Field of Classification Search ............... 704/9; 707/2–5
See application file for complete search history.

(56) References Cited

U.S. PATENT DOCUMENTS 5,832,476 A * 11/1998 Tada et al. ............... 707/2

(Continued)

OTHER PUBLICATIONS

Salton, G., *Automatic Text Processing: The Transformation, Analysis, and Retrieval of Information*, Chapter 10: Advanced Information—Retrieval Models, Addison-Wesley, 1989, pp. 313-26.

(Continued)

*Primary Examiner*—Patrick N. Edouard
*Assistant Examiner*—Lamont M Spooner
(74) *Attorney, Agent, or Firm*—Jacobson Holman PLLC

(57) ABSTRACT

A computer-automated system and method identify text in a first "citing" court case, near a "citing instance" (in which a second "cited" court case is cited), that indicates the reason(s) for citing (RFC). The automated method of designating text, taken from a set of citing documents, as reasons for citing (RFC) that are associated with respective citing instances of a cited document, has steps including: obtaining contexts of the citing instances in the respective citing documents (each context including text that includes the citing instance and text that is near the citing instance), analyzing the content of the contexts, and selecting (from the citing instances' context) text that constitutes the RFC, based on the analyzed content of the contexts. A related computer-automated system and method selects content words that are highly related to the reasons a particular document is cited, and gives them weights that indicate their relative relevance. Another related computer-automated system and method forms lists of morphological forms of words. Still another related computer-automated system and method scores sentences to show their relevance to the reasons a document is cited. Also, another related computer-automated system and method generates lists of content words. In a preferred embodiment, the systems and methods are applied to legal (especially case law) documents and legal (especially case law) citations.

15 Claims, 4 Drawing Sheets

U.S. PATENT DOCUMENTS

| | | | |
|---|---|---|---|
| 5,918,236 A | 6/1999 | Wical | |
| 6,286,018 B1 * | 9/2001 | Pitkow et al. | 715/206 |
| 6,289,342 B1 * | 9/2001 | Lawrence et al. | 707/7 |
| 6,457,028 B1 * | 9/2002 | Pitkow et al. | 715/206 |
| 6,499,026 B1 * | 12/2002 | Rivette et al. | 707/2 |
| 6,799,176 B1 * | 9/2004 | Page | 707/5 |
| 6,856,988 B1 * | 2/2005 | Humphrey et al. | 707/7 |
| 7,058,628 B1 * | 6/2006 | Page | 707/5 |
| 7,246,310 B1 * | 7/2007 | Wolfe | 715/236 |
| 7,302,638 B1 * | 11/2007 | Wolfe | 715/273 |

OTHER PUBLICATIONS

Porter, M. F., *An algorithm for suffix stripping*, Program 14, No. 3, pp. 130-137, Jul. 1980.

Small, Henry, *Co-citation in the Scientific Literature: A New Measure of the Relationship Between Two Documents*, Reprinted from Am. Soc. Information Science, Jul.-Aug. 1973, vol. 24, No. 4.

* cited by examiner

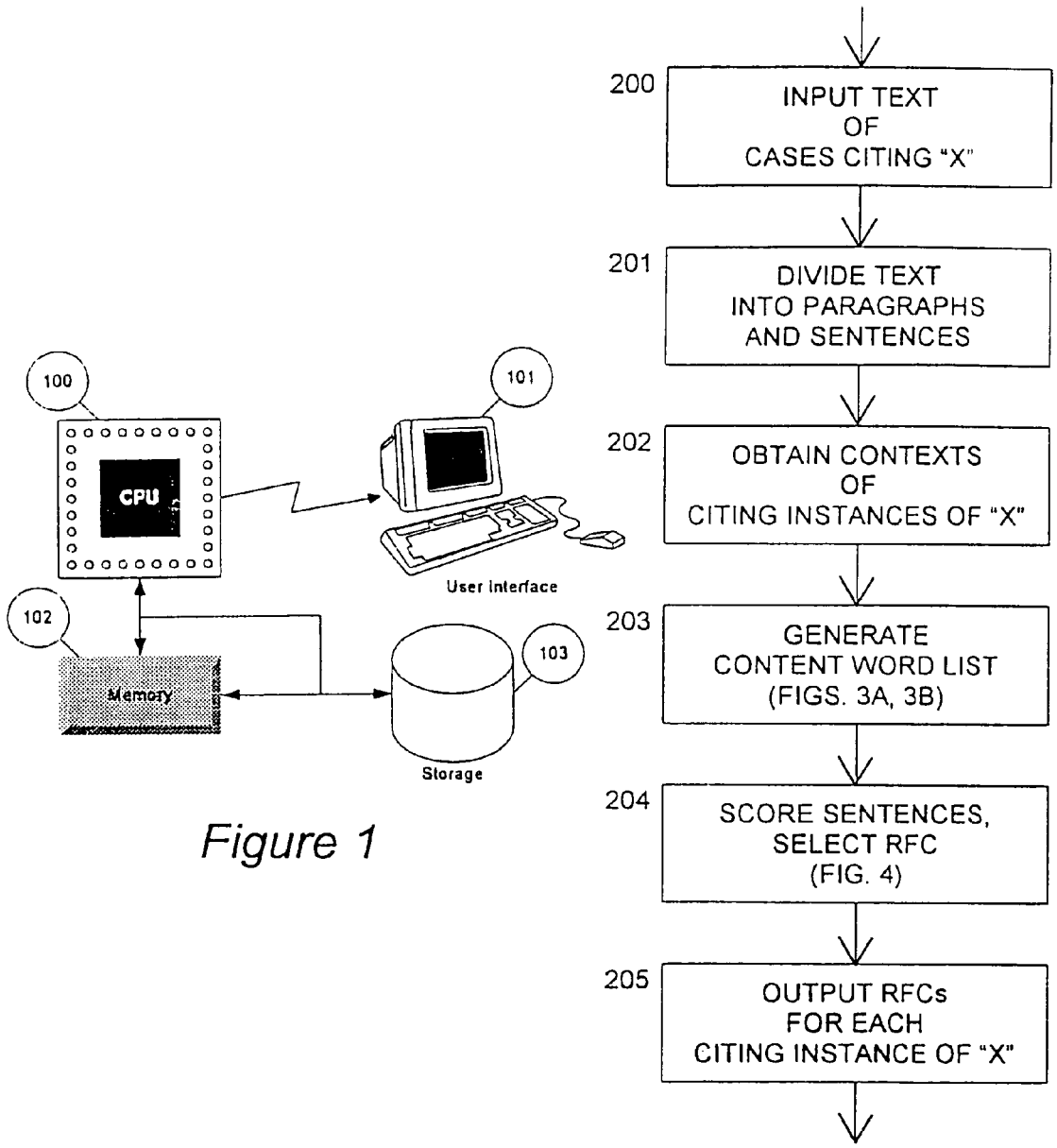

AUTOMATED SYSTEM AND METHOD FOR GENERATING REASONS THAT A COURT CASE IS CITED

This application is a divisional application of patent application, U.S. Ser. No. 09/468,785 filed Dec. 21, 1999, issuing as U.S. Pat. No. 6,856,988 with issue date of Feb. 15, 2005, and is entitled to and hereby claims the priority thereof.

COPYRIGHT NOTICE

A portion of this disclosure, including Appendices, is subject to copyright protection. Limited permission is granted to facsimile reproduction of the patent document or patent disclosure as it appears in the U.S. Patent and Trademark Office (PTO) patent file or records, but the copyright owner reserves all other copyright rights whatsoever.

BACKGROUND OF THE INVENTION

1. Field of the Invention

The present invention relates to systems and methods for automated text processing, and for automated content and context analysis. In particular, the present invention relates to automated systems and methods of identifying sentences near a document citation (such as a court case citation) that suggest the reason(s) for citing (RFC).

2. Related Art

In professional writing, people cite other published work to provide background information, to position the current work in the established knowledge web, to introduce methodologies, and to compare results. For example, in the area of scientific research, a researcher has to cite to demonstrate his contribution to new knowledge. As another example, in writing court decisions, a judge has to cite precedent legal doctrine to comply with the common law tradition of stare decisis. However, the citing in the legal profession is more precise than that in the scientific research community.

Courts deal with legal issues such as points of law or facts in dispute. Issues arise over differences of opinion as to definition, interpretation, applicability of specific facts and acts, prior decisions, legal principles or rules of law. Every court decision or case involves one or more issues (the reason a law suit was brought). In addition, in most cases there are usually several sub-issues that arise from the detailed analysis and consideration of the issues. Thus, almost every case discusses multiple issues.

However, these multiple issues are often not intrinsically related as one might expect in scientific literature. Rather, the issues only occur together in a given case because they have a bearing on the specific factual situation dealt with in that case. Discussion of each issue or sub-issue is usually supported by citing relevant legal authorities, which may not be related to one another.

For example, *People v. Surplice,* 203 Cal. App.2d 784, is frequently cited for the general issue of how the court should exercise its judicial discretion when the law allows it. But, it is also frequently cited for the more specific issue that says that it is reversible error when a judge fails to read and consider a probation officer's pre-sentence report.

As a result, when a citing case criticizes a cited case, the citing case is usually not criticizing the whole case. Most of the time, the criticism is on a specific legal issue. Similarly, a citing case may reference a cited case for a specific, supportive point of law.

It is not unusual to read a citing case that both agrees with the cited case on one issue, and disagrees with it on a different issue. Traditional content analysis techniques that apply statistical models on whole documents run into difficulty in pinpointing the exact reason a case is cited.

Thus, there is a need in the art to provide a technique that can extract the reason for citing (RFC) at a local region where the citing instance occurs. However, there do not appear to be any conventional systems for performing the required task of finding text near a citing instance that indicates the reason a document is cited. It is to fulfill this need, among others, that the present invention is directed. In fulfilling this need, the invention provides new applications of techniques that are known in the art, such as word stemming, informetrics and vector space information retrieval, which are now briefly discussed.

Porter in [Porter 1980] describes a word stemming algorithm that strips suffixes from words. This conventional word stemming algorithm handles many types of suffixes and is not limited by the length of a word. However, this approach is not computationally very fast and does not perform well on document sets containing many long words, such as court opinions and medical journal articles. However, Applicants have recognized that it is desirable to use stemming to find morphological variations of words—that is, words that have different suffixes. Applicants have recognized that, because many input documents (especially court opinions) contain many long words, it is valuable to provide a stemming method that simply shortens them to their first N letters (where N is a positive integer such as six). Such an inventive stemming method is described in the Detailed Description.

Informetrics is a term whose definition is somewhat ambiguous in the literature. It appears to have been first introduced in 1979 as general term covering both bibliometrics and scientometrics [Brookes, 1991]. All three terms have been used loosely to mean more or less the same thing. Informetrics can be perceived in its broadest sense as "the study of the quantitative aspects of information in any form" [Brookes, 1991, p. 1991], or as "the search for regularities in data associated with the production and use of recorded information" [Bookstein et al., 1992].

Small [Small 1978], a bibliometrics researcher, found that if one examines the text around citing instances of a given scientific document, one can determine the 'particular idea the citing author is associating with the cited document'. He goes on to say that the citation of a cited scientific document becomes a symbol for the ideas expressed in the text of the citing instance. However, court case opinion citation differs from that of the scientific community in two fundamental ways.

First, in the legal profession, a citing instance is normally for single point-of-law, definition, or fact pattern that is precisely stated near the citing instance. In contrast, in the scientific community, a citing instance is often for very general principles or ideas that are normally not precisely stated near the citing instance.

Second, in the legal profession, two citing instances of a particular case are often for differ points of law, definitions, or fact patterns [Morse 1998]. In contrast, in the scientific community two citing instances are generally for the same principles or ideas that are not clearly stated or imprecisely stated near the citing instance.

Therefore, bibliometrics methods that use just the frequency of citation of documents do not generally work as well when applied to legal citations as they did when applied to scientific citations. As an example, take co-citation analysis [Small 1973], which is the analysis of the frequency that two citations appear in the same document. One conclusion that co-citation analysis produces is that two documents citing the same two other documents have a high probability of being about closely related topics. But in the legal profession, this is not true as often as it is in the scientific community.

For example, if both of two case law documents D1 and D2 cite *People* v. *Surplice*, and both documents cite another case for an issue related to "a probation officer's pre-sentence report", then co-citation analysis would conclude that these two cases have similar topics. But, if D1 cites *People* v. *Surplice* for the first very general reason (how the court should exercise its judicial discretion), and D2 cites it for the 2nd very specific reason (dealing with a probation officer's pre-sentence report), then D1 and D2 could be about very different topics.

Accordingly, something more than mere co-citation frequency counts is needed to determine if two cases are similar in topic. It is to fulfill this need, among others, that the present invention is directed.

Concerning vector space information retrieval, the "Smart" system [Salton 1989] is an example of an information retrieval system based on the vector processing model. The goal of the Smart system is to find the documents that are similar to a "query" (a list of words). Both queries and documents are represented as word vectors. In the simple case, each element of a word vector is the frequency that a specific word appears in the document collection.

A simple method of determining the similarity of a document to a query is to compute the dot product of the document's and query's word vectors. The dot product is the sum of the products of corresponding elements from the two word vectors, where corresponding elements contain the frequency counts of a given word, either in the document set or the query. Normally this similarity metric is normalized by taking into account the lengths of the document and query. The present invention provides, among other advantages, a new application of the vector processing model and similarity metric like the one described above.

U.S. Pat. No. 5,918,236 (Wical; hereinafter "the '236 patent") may be considered relevant. The '236 patent discloses a system that generates and displays "point of view gists" and "generic gists" for use in a document browsing system. Each "point of view gist" provides a synopsis or abstract that reflects the content of a document from a predetermined point of view or slant. A content processing system analyzes documents to generate a thematic profile for use by the point of view gist processing.

The point of view gist processing generates point of view gists based on the different themes or topics contained in a document. It accomplishes this task by identifying paragraphs from the document that include content relating to a theme for which the point of view gist is based. The '236 patent's Summary of the Invention discloses that the point of view gist processing generates point of view gists for different document themes by relevance-ranking paragraphs that contain a paragraph theme corresponding to the document theme that was determined by analyzing document paragraphs and the whole document.

However, the '236 patent's relevance-ranking does not solve the problem solved by the present invention—determining which sentences near a citing instance to determine which sentences are the best ones to represent the reason for citing (RFC). Thus, there is a need in to art to provide a system that relevance-ranks sentences near a citing instance based on the similarity of each such sentence to typical context of many citing instances for a given document. Furthermore, there is a need to provide a system to determine typical context by analyzing the context of many citing instances for the same case. It is to fulfill these various needs, among others, that the present invention is directed.

REFERENCES

1. Bookstein, A.; O'Neil, E.; Dillion, M.; and Stephens, D., 1992, "Application of loglinear models to informetrics phenomena", *Information Processing and Management*, 28(1), 75.
2. Brookes, B., 1991, "Biblio-, sciento-, infometrics??? What are we talking about?", *Infometrics* 89/90, edited by Egghe, L. & Rousseau, R., Amsterdam, Elsevier, 31-44.
3. Moor, W. J. 1988, "Citation Context Classification of a citation classic concerning Citation Context Classification", *Social Studies of Science*, 18, pp. 515-521.
4. Morse, A. L., 1998, "Citation Sources in Michigan Supreme Court Opinion", dissertation from University of Michigan, published by UMI Dissertation Service.
5. Porter, M., 1980, "An algorithm for suffix stripping, Program", *Automated Library and Information* 14(3), p. 130-137
6. Salton, G., 1989, *Automatic Text Processing: The Transformation, Analysis, and Retrieval of Information*, Addison-Wesley Publishing.
7. Small, H., 1973, "Co-citation in scientific literature: A new measure of the relationship between two documents", *JASIS* 24(4), p. 265-269.
8. Small, H., 1978, "Cited Documents as Concept Symbols", *Social Studies of Science*, 8, pp. 327-340

SUMMARY OF THE INVENTION

The invention fulfills the various needs described above.

The invention provides a computer-automated system and method for identifying text, near a citing instance, that indicates the reason(s) for citing (RFC).

The invention further provides a computer-automated system and method for selecting content words that are highly related to the reasons a particular document is cited, and giving them weights that indicate their relative relevance.

The invention further provides a computer-automated system and method for forming lists of morphological forms of words.

The invention further provides a computer-automated system and method for scoring sentences to show their relevance to the reasons a document is cited.

The invention further provides a computer-automated system and method for generating lists of content words.

In a preferred embodiment, the invention is applied to legal (especially case law) documents and legal (especially case law) citations.

Other objects, features and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 1 illustrates an exemplary hardware configuration in which the inventive system and method may be implemented.

FIG. 2 is a high-level flow chart of a preferred implementation of the RFC (reason for citing) method according to the present invention.

FIG. 3B is like FIG. 3A except that it uses the actual text of cited document X, and pairs paragraphs of citing instances of X with paragraphs of X itself.

FIGS. 3A and 3B may be referred to collectively as "FIG. 3."

DETAILED DESCRIPTION OF THE PREFERRED EMBODIMENTS

Figure 3A:
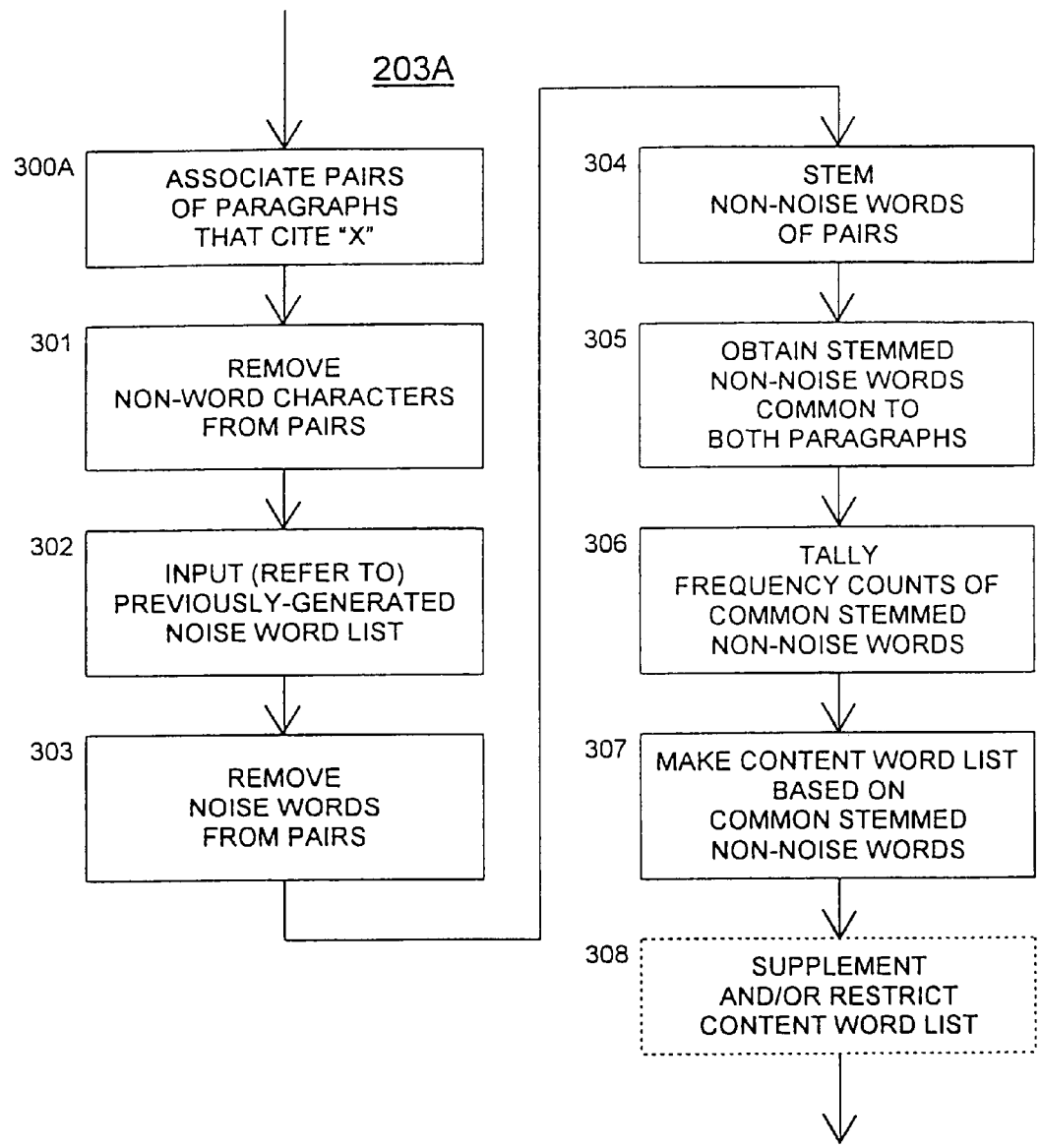
FIG. 3A is a flow diagram showing a first exemplary embodiment of the FIG. 2 step 203 of generating a content word list.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

For example, in addition to being applied to legal case law documents (court opinions), the invention may be applied to any other type of document that contains citations. Also, what this specification refers to as a "sentence" may be any text unit that makes up paragraphs. Likewise, what this specification refers to as a "paragraph" can refer to any chunk of text that makes up a document and that are made of "sentence" text units.

Definitions of terminology. As used in this specification, the following terms have the following meanings:

Citing instance—the citation of a "cited" case X found in another "citing" case Y. For example, when *McDougall v. Palo Alto School District* cites *Ziganto v. Taylor*, the citation is referred to as "a citing instance of *Ziganto* in *McDougall*."

Content words—words that convey the content of documents.

Content word's frequency count—the number of times a content word is in a paragraph of a citing instance of X.

Context of the citing instance—text around a citing instance of X. For example, the paragraph of a citing instance and the paragraphs before and after it are one example of a "context" of the citing instance.

Noise words—words that occur in almost all input documents and therefore do not convey much about the content of any one document. Noise words are normally removed when analyzing content. Appendix C has an exemplary list of noise words.

Paragraph of a citing instance—the paragraph of some case that contains a citing instance. For example, the paragraph of *McDougall v. Palo Alto School District* that contains a citing instance of *Ziganto v. Taylor* would be called a paragraph of a citing instance of *Ziganto*.

RFC—the text, such as sentences in the context of a citing instance of X, that has the largest calculated content score and that therefore likely indicates the reason a cited document was cited.

With these definitions established, the structure and operation of preferred embodiments of the invention are now described.

Referring to FIG. 1, embodiments of the inventive RFC generation system may be implemented as a software system including a series of modules on a conventional computer. An exemplary hardware platform includes a central processing unit 100. The central processing unit 100 interacts with a human user through a user interface 101. The user interface is used for inputting information into the system and for interaction between the system and the human user. The user interface includes, for example, a video display, keyboard and mouse.

A memory 102 provides storage for data (such as the documents containing the citing instances, the content word lists, and the noise word list). It also may provide storage for software programs (such as the present RFC generation process) that are executed by the central processing unit. An auxiliary memory 103, such as a hard disk drive or a tape drive, provides additional storage capacity and a means for retrieving large batches of information.

All components shown in FIG. 1 may be of a type well known in the art. For example, the system may include a SUN workstation including the execution platform SPARCsystem 10 and SUN OS Version 5.5.1, available from SUN MICROSYSTEMS of Sunnyvale, Calif. The software may be written in such programming languages as C, C++ or Perl. Of course, the system of the present invention may be implemented on any number of computer systems using any of a variety of programming languages.

Exemplary embodiments of the inventive methods provided by the invention are now described.

Briefly, in a particular preferred embodiment of the invention, the text of documents that cite a particular document X is input. Then, the system extracts from each of these documents, text around each citing instance of X (that is, the "context" of a citing instance of X). The system then uses paragraphs containing the citing instances of X, found in the contexts, to generate a list of content words. It then uses the list of content words to calculate a content score for each sentence in each context of each citing instance of X, and selects the sentences with the highest score as the RFC for that citing instance of X.

Embodiments of the inventive method are now described in greater detail.

Referring to FIG. 2, a high-level flow chart of the RFC generation method is shown. Block 200 represents input of the text of documents (such as court opinions) that cite a document X, which is by pertinent example a court opinion.

Block 201 is the step of dividing the documents into "paragraphs" (or other suitable entity), and dividing each "paragraph" into "sentences" (or other suitable sub-entity). One way to divide a case into paragraphs is to assume that blank lines separate paragraphs. To divide paragraphs into sentences, it may be assumed that sentences always end with at least four lower case letters that are immediately followed by a period. These two assumptions do not divide cases perfectly into paragraphs, nor do they divide paragraphs perfectly into sentences, but it is an advantage of the inventive RFC determination method that it does not require perfect divisions.

Table 1 illustrates an exemplary way that the text of court opinions can be input to this invention. Table 1 shows that each sentence of a case that cites X is assigned a) an index for the paragraph it is in, and b) a sentence index.

In the illustrated example, sentences are entered in the order they appear in the case. In addition, the sentence containing a citation of X is marked and the citation in the sentence is marked. For example, in Table 1, sentence 5 contains the citation of interest, *Ziganto v. Taylor,* 198 Cal.

App. 603, and is marked with an asterisk in the paragraph number column. Also, the citation of that sentence is enclosed with sgml tags:
<citation> . . . </citation>.

TABLE 1

The "Context" of a citing instance of Ziganto, from McDougall plus paragraph and sentence indexing

| Paragraph Number | Sentence Number | Sentence Text |
|---|---|---|
| 1 | 1 | We have not been referred to, nor have we found, any case upholding the plea of res judicata in the precise instant situation. |
| 1 | 2 | For the reasons we have given above, we are persuaded that such plea cannot be availed of "offensively" in the case before us and that the effect of the original grant should be determined anew and independently of the earlier action. |
| 2 | 3 | We therefore turn to the original deed of William Paul. |
| 2 | 4 | Since no extrinsic evidence was introduced in the court below, the construction of the deed presents a question of law. |
| 2* | 5 | We are not bound by the trial court's interpretation of it, and we therefore proceed, as it is our duty, to determine the effect of its foregoing provisions according to applicable legal principles. <citation>*(Estate of Platt (1942) 21 Cal.2d 343, 352 (131 P.2d 825); Jarrett v. Allstate Ins. Co. (1962) 209 Cal.App.2d 804, 809-810 (26 Cal. Rptr. 231), Ziganto v. Taylor (1961) 198 Cal.App.2d 603, 606 (18 Cal. Rptr. 229), Moffatt v. Tight (1941) 44 Cal.App.2d 643, 648 (112 P.2d 910).)*</citation> |
| 3 | 6 | Appellants contend that the deed in question created a fee simple determinable in the school district with a possibility of reverter in the original grantor, his heirs and assigns. |
| 3 | 7 | We have concluded that such contention has merit. |

*(the asterisk) marks the paragraph and sentence that contains the citation of interest, namely, the citation to Ziganto.

Referring again to FIG. 2, in block 202 the system determines a "context" (surrounding text) for all citing instances of X. The context of all citing instances of X is used in steps 203 and 204, discussed below.

Block 203 represents the step of generating a content word list. Two exemplary implementations of this step are described below, with reference to FIGS. 3A and 3B.

Block 204 represents the step of scoring sentences, and selecting those sentences with the highest score (or other enhanced selection technique) as being the desired RFCs. This step is described in greater detail with reference to FIG. 4.

Finally, block 205 represents the output of the FIG. 2 process, namely, RFCs for each citing instance of X.

Next, the process' steps and alternate embodiments thereof are described in detail, with reference to a particular example.

After the text of the legal cases citing X is input (step 200) and parsed into paragraphs and sentences (step 201), the "context" for all citing instances of X is obtained as follows. Table 1 shows the text of a case that cites X divided into paragraphs and sentences. Step 202 uses the X citation marker (which accompanies the citing sentence in Table 1) to locate the paragraph containing a citation to X. For each citing instance of x, an exemplary implementation of step 202 extracts:

the paragraph containing the citation to X (paragraph 2 in Table 1);

the paragraph before the paragraph containing the citation to X (paragraph 1 in Table 1); and the paragraph after the paragraph containing the citation to X (paragraph 3 in Table 1).

In this embodiment, these three paragraphs are considered the "context of the citing instance of X."

Of course, variations on this choice of context lie within the scope of the invention. In any implementation, an important consideration is to have enough context so that sentences that are in fact relevant to why a case is cited is included in the context. Also, it is important that there be at least a few sentences in the context, so that scoring and selecting step 204 has more than one sentence to score and choose from. Further, it is important for the context determination step to account for short paragraphs, and paragraphs of citing instances at the beginning or end of a document. These are conditions that might otherwise cause the context to be too small (contain too few sentences).

Alternative examples of methods of determining the context are:

selecting only the paragraph containing the citing instance; or selecting M sentences before the citing instance and N sentences after the citing instance, where M and N are different may be variable.

However the context is determined, the context of each citing instance of X is used by steps 203 and 204.

Block 203 represents the step of generating content word list. Content word list generation step 203 (detailed in flow diagram in FIGS. 3A and 3B) inputs the context for each citing instance of X from step 202. Step 203 also uses a previously-generated "Noise word" list, exemplified in Appendix C.

The steps in first and second exemplary embodiments of step 203 are described with reference to FIGS. 3A and 3B, respectively.

Referring first to FIG. 3A, in step 300A paragraphs of citing instances from the contexts of the instances of X are paired (associated with each other). Each paragraph of a given citing instance of X is paired with every other paragraph of a citing instance of X that is not in the same case as the given citing instance.

As an example, consider a hypothetical situation in which there are four citing instances of case X—one citing instance in case A, two citing instances in case B, and one citing instance in case C. The citing instances may be denoted as:

1A, 2B, 3B, 4C where the letter in the denotation indicates the citing case. If this denotation is used to label the four paragraphs containing these four citing instances, then the pairs created by step 300A would be:

1A-2B
1A-3B
1A-4C
2B-4C
3B-4C

Paragraphs 2B and 3B are not paired because they are in the same case.

The following is an example of one pair of paragraphs for citing instances of *Ziganto* v. *Taylor*. The citing cases are *McDougall* v. *Palo Alto School District*, 212 Cal. App. 3d 422, and *Jarrett* v. *Allstate Ins. Co.*, 209 Cal. App. 2d 804.

*Ziganto* in *McDougall*: We therefore turn to the original deed of William Paul. Since no extrinsic evidence was introduced in the court below, the construction of the deed presents a question of law. We are not bound by the trial court's interpretation of it, and we therefore proceed, as it is our duty, to determine the effect of its foregoing provisions according to applicable legal principles. (*Estate of Platt* (1942) 21 Cal.2d 343, 352 (131 P.2d 825); *Jarrett* v. *Allstate Ins. Co.* (1962) 209 Cal.App.2d 804, 809-810 (26 Cal. Rptr. 231); *Ziganto* v. *Taylor* (1961) 198 Cal.App.2d 603, 606 (18 Cal. Rptr. 229); *Moffatt* v. *Tight* (1941) 44 Cal.App.2d 643, 648 (112 P.2d 910).)

*Ziganto* in *Jarrett*: The construction of the instant contract is one of law because it is based upon the terms of the insurance contract without the aid of extrinsic evidence. Accordingly, we are not bound by the trial court's interpretation of it, but it is our duty to make the final determination in accordance with the applicable principles of law. (*Estate of Platt*, 21 Cal.2d 343, 352 (131 P.2d 825); *Ziganto* v. *Taylor,* 198 Cal.App.2d 603, 606 (18 Cal. Rptr. 229).) Our interpretation does, however, coincide with that made by the trial court.

Step 301 is the step of removing anything that is not a word, from both paragraphs of a pair. In this example, step 301 results in the following two lists of words:

*Ziganto* in *McDougall*: We therefore turn to the original deed of William Paul Since no extrinsic evidence was introduced in the court below the construction of the deed presents a question of law We are not bound by the trial court interpretation of it and we therefore proceed as it is our duty to determine the effect of its foregoing provisions according to applicable legal principles

*Ziganto* in *Jarrett*: The construction of the instant contract is one of law because it is based upon the terms of the insurance contract without the aid of extrinsic evidence Accordingly we are not bound by the trial court interpretation of it but it is our duty to make the final determination in accordance with the applicable principles of law Our interpretation does however coincide with that made by the trial court Step 302 is the step of inputting (or referring to previously-input) noise words from a noise word list. Appendix C illustrates a noise word list that may be used in this embodiment.

Step 303 is the step of removing noise words from both paragraphs. For this example, step 303 results in the following two lists of non-noise words:

*Ziganto* in *McDougall*: turn original deed William Paul Since extrinsic introduced below construction deed presents bound interpretation proceed duty determine effect foregoing provisions according applicable legal principles

*Ziganto* in *Jarrett*: construction instant contract based terms insurance contract aid extrinsic bound interpretation duty make final determination accordance applicable principles interpretation however coincide made Step 304 is the step of stemming the remaining non-noise words of both paragraphs by shortening them to their first N letters (N is a positive integer) when any has more than N letters to begin with. (The choice of exactly six letters is somewhat arbitrary, and the exact number of letters may of course be varied while still remaining within the scope of the present invention.) Then, the resulting stemmed words are alphabetized. For this example, stemming step 304 results in the following two lists of stemmed non-noise words:

*Ziganto* in *McDougall*: accord applic below bound constr deed deed determ duty effect extrin forego interp introd legal origin Paul presen princi procee provis Since turn Willia

*Ziganto* in *Jarrett*: accord aid applic based bound coinci constr contra contra determ duty extrin final howeve instan insura interp interp made make princi terms Step 305 is the step of determining the "common" stemmed, non-noise words—those stemmed, non-noise words that are in both paragraphs of a pair. In this example, step 305 results in the following list of stemmed non-noise words that are common to the two paragraphs:

accord applic bound constr determ duty extrin interp princi

Step 306 is the step of tallying each common, stemmed, non-noise word's frequency count by adding one to its frequency count for each paragraph in the pair that has not been processed by this process. Because the paragraphs in the example are the first two paragraphs processed by this step, each of the above stems has a frequency count of exactly 2 because each is in both paragraphs in the pair. However, as paragraphs after the first two paragraphs are processed, the numbers of some of the stems grow to higher than 2 as the stems are again encountered.

Step 307 is the step of designating as content words, the non-noise words whose stems are the common stemmed non-noise words. In this example, these words are:

accordance according, applicable, bound, construction, determination determine, duty, extrinsic, interpretation, principles In the above list of words, different morphological forms of the same word ("accordance" and "according") are separated by a space and not by a comma. These forms are associated because they have the same first six letters.

This completes discussion of this one application of FIG. 3A to a single pair of paragraphs. Appendix A shows a complete list of content words and associated tallied frequency counts generated by the FIG. 3A embodiment when applied to all paragraphs of citing instances.

The invention provides that the content word list may be supplemented and/or restricted by additional techniques. Such supplementation and/or restriction of the content word list constitute optional steps shown schematically as optional step 308.

For example, the content word list may be supplemented with specific words and phrases that often indicate legally significant text. For example, words that might specifically indicate concise expression of rules of law, or words indicating how the citing case is treating the cited case, are meaningful and may thus be included in content word lists. Such words include, for example, "following," "overruling," "questioning," and so forth.

Conversely, the content word list can be restricted by other techniques. For example, it is possible to require a non-noise word to be in more than a given number M paragraphs of citing instances (M>2, for example). Words in the content word list that do not meet this criteria are removed from the list.

Further, it is possible to remove from the content word list, non-noise words to be in at least M paragraphs of citing instances (M≧2, for example), along with W other non-noise words. For example, if M=2 and W=3, then the non-noise word "injury" would be a content word because it is in two paragraphs of citing instances with the other three non-noise words "insured", "vehicle", and "coverage".) Words in the content word list that do not meet this criteria are removed from the list.

Variations of the content word generation method lie within the contemplation of the invention, based on at least the following observations.

The FIG. 3A method of generating a list of content words (which includes comparing the text of each paragraph of a citing instance of X to the text of other paragraphs of citing instances of X), results in the same list of content words as taking all the non-noise words that have occurred in at least two paragraphs of citing instances of X. However, by viewing the process as taking words in common that result from a comparison of two sets of paragraphs, the resulting content words could be very different if the two sets of paragraphs are very different.

Figure 3B:
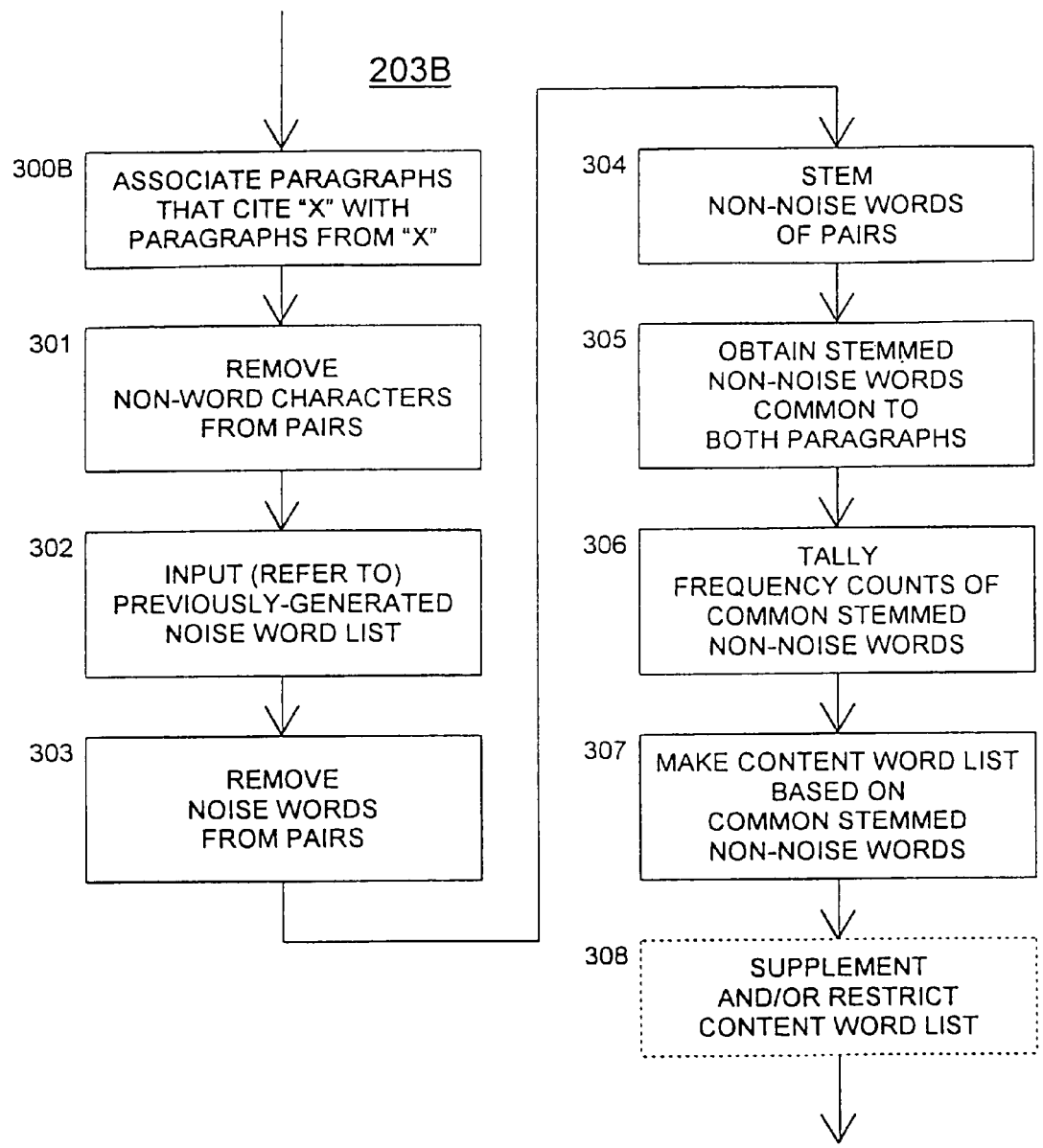
FIG. 3B is a flow diagram showing a second exemplary embodiment of the FIG. 2 step 203 of generating a content word list.

Also, referring now to FIG. 3B, a second embodiment of the method of generating content words compares paragraphs of citing instances of X to paragraphs in the Majority Opinion of X itself. One situation in which it is advisable to use the second embodiment to generate content words is when case X has not been cited often. In this situation, there will be few paragraphs of citing instances to compare.

Still another alternative embodiment involves combining paragraphs of citing instances with paragraphs from the Majority Opinion of X, and comparing each paragraph of a citing instance with both.

The second embodiment of FIG. 2 step 203 is now described with reference to its decomposed flow diagram in FIG. 3B. Input used by this alternative embodiment is different from that used by FIG. 3A, and includes the context for each citing instance of X and the text of the legal case X itself. As in FIG. 3A, the final output of method of FIG. 3B is a list of content words.

Briefly, the second embodiment of the method of generating a list of content words includes comparing the text of each paragraph of a citing instance of X to the text of each paragraph in the Majority Opinion of X. Like the first embodiment, each time two paragraphs are compared, the result is a list of words they have in common, and these common words are the words that become the content words.

Comparing two paragraphs in the FIG. 3B embodiment may be chosen to be generally the same as the comparing process in the FIG. 3A embodiment. For the FIG. 3B method, each paragraph of X itself is paired with each paragraph of a citing instance of x as shown in step 300B which is the only step different from its corresponding step in FIG. 3A. As an example, consider the hypothetical situation in which there are:

three citing instances of case X; and
four paragraphs in the Majority Opinion of X.

In this situation, each of the three paragraphs of the three citing instances are paired with each of the four paragraphs of the Majority Opinion of X, yielding 3×4=12 pairs of paragraphs.

The description of the second embodiment is abbreviated, it being understood that the foregoing discussion of FIG. 3A applies to corresponding steps in FIG. 3B.

Applying this technique to the concrete example includes pairing the citing paragraph in *McDougall* to the second paragraph of the Majority Opinion of *Ziganto:*

*McDougall*: We therefore turn to the original deed of William Paul. Since no extrinsic evidence was introduced in the court below, the construction of the deed presents a question of law. We are not bound by the trial court's interpretation of it, and we therefore proceed, as it is our duty, to determine the effect of its foregoing provisions according to applicable legal principles. (*Estate of Platt* (1942) 21 Cal.2d 343, 352 (131 P.2d 825); *Jarrett* v. *Allstate Ins. Co.* (1962) 209 Cal.App.2d 804, 809-810 (26 Cal. Rptr. 231); *Ziganto* v. *Taylor* (1961) 198 Cal.App.2d 603, 606 (18 Cal. Rptr. 229); *Moffatt* v. *Tight* (1941) 44 Cal.App.2d 643, 648 (112 P.2d 910).)

*Ziganto* $2^{nd}$ paragraph: Appellant is the owner of a lot in Palo Alto upon which he arranged for the construction of an apartment house by a general contractor. During the course of construction respondent, a subcontractor and materialman, at the request of the contractor furnished certain cabinets and other materials of a claimed value of $5,075.21 which were used in the building. On Jan. 26, 1959, respondent filed for record his claim of lien in the above amount.

After removing everything not a word, removing noise words, and shortening to their first N=6 letters those words having more than six letters, the potential content words in *McDougall* and *Ziganto* to are:

*McDougall*: accord applic below bound constr deed deed determ duty effect extrin forego interp introd legal origin Paul presen princi procee provis Since turn Willia

*Ziganto* $2^{nd}$ paragraph: above Alto amount apartm arrang buildi cabine certai claim claime constr constr contra contra course During furnis house Januar lien lot materi materi owner Palo record reques respon respon subcon used value The following is the "list" of words in common (in this case, a list of one word) that therefore becomes the sole contribution of this pair of paragraphs to the content word list:

Construction

A complete list of content words generated for this example by all paragraphs processed by the FIG. 3B embodiment is provided in Appendix B.

Of course, it is envisioned that still further methods, and variations of methods, may be used to generate lists of content words, in addition to those shown in FIGS. 3A and 3B.

Figure 4:
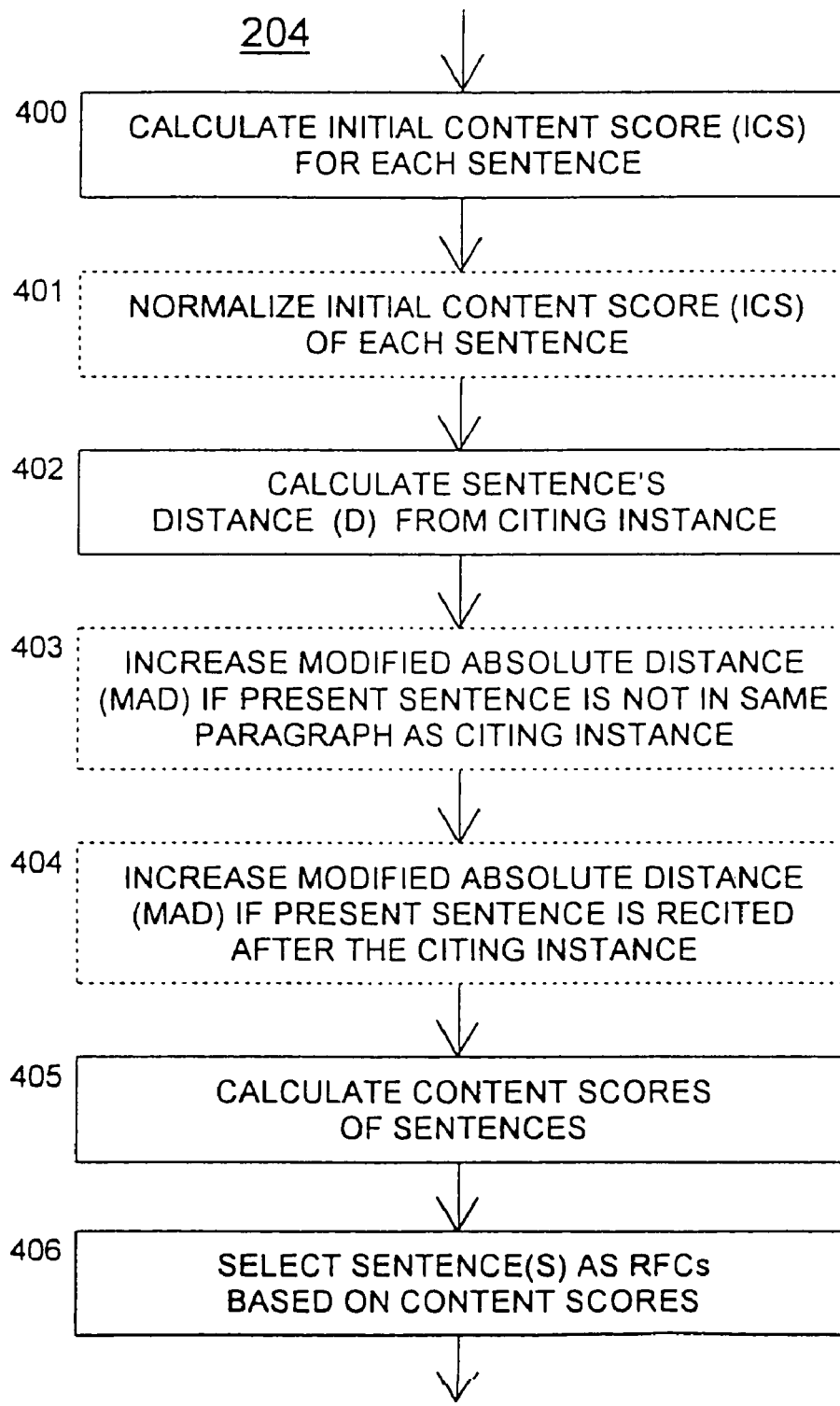
FIG. 4 is a flow diagram showing an exemplary embodiment of the FIG. 2 step 204 of scoring sentences and selecting those with highest scores as RFCs.

Referring again to FIG. 2, step 204 represents the step of scoring text (such as sentences) and selecting those with the highest score(s) as the RFC. An RFC may be one or more sentences. Step 204's decomposed flow diagram is shown in FIG. 4.

The following describes calculation of a content score using, as an example, the first sentence in the context of the citing instance of *Ziganto* in *McDougall*. The first sentence in this context (the first row in the body of Table 2) is the focus of discussion of individual steps in FIG. 4. Table 2 shows the sentences of this example's context, along with the values calculated by the steps in FIG. 4.

In Table 2, there are seven sentences, one in each row. There are seven columns in Table 2:
1) The column labeled "Sentence . . .", contains:
   a) the text of sentences in the context,
   b) each content word found in the sentences, and
   c) each content word's respective frequency count, determined from the content word list such as one or more of those shown in Appendix A or Appendix B.
2) The column labeled W shows the number of words in the sentence.
3) The column labeled ICS shews the sentence's initial content score.
4) The column labeled NICS shows the normalized initial content score.
5) The column labeled D shows the sentence's distance, in number of sentences, from the citing instance of Ziganto, which in this case is the fifth sentence.
6) The column labeled MAD shows the modified dsolute value of distance D after it has been modified by steps 403 and 404 (FIG. 4).
7) The column labeled CS shows each sentence's calculated content score.

Therefore, the initial content score (ICS) for the first sentence is 3, which is entered in the ICS column of the first row of Table 2. As another example, the fourth sentence has four content words whose frequency counts total 7+3+6+5=21, so that 21 is listed in the ICS column of row 4.

The ICS may be normalized to provide a fairer and more meaningful contribution to the final content score CS that is ultimately calculated.

Block 401 is the optional step of normalizing the initial content scores (ICSs) to arrive at normalized initial content scores (NICSs). In a preferred embodiment, normalization is accomplished by dividing the ICS by the product of the number of words in the sentence (W) and by the largest frequency count of any content word in the content word list (Appendix A). In the first row of Table 2, the number of words in the sentence is 23 and the largest frequency count in the list of content words of Appendix A is 8. Therefore, the NICS (rounded to 2 decimal places) is 3/(8*23) or 0.02, which is entered in the first row of the NICS column in Table 2.

Block 402 is the step of determining the number of sentences between the present sentence and the closest citing instance of X. This number of sentences is the distance D for the present sentence. Sentences before the closest citing instance are assigned negative numbers, and sentences after the citing instance are assigned positive numbers. In the

TABLE 2

| Sentence, content words in sentence, and each content word's frequency count | W | ICS | NICS | D | MAD | CS |
|---|---|---|---|---|---|---|
| We have not been referred to, nor have we found, any case upholding the plea of *res judicata* in the precise instant situation. (instant(3)) | 23 | 3 | 0.02 | −4 | 6 | 0.01 |
| For the reasons we have given above, we are persuaded that such plea cannot be availed of "offensively" in the case before us and that the effect of the original grant should be determined anew and independently of the earlier action. (determined(8)) | 41 | 8 | 0.02 | −3 | 5 | 0.01 |
| We therefore turn to the original deed of William Paul. | 10 | 0 | 0.00 | −2 | 2 | 0.00 |
| Since no extrinsic evidence was introduced in the court below, the construction of the deed presents a question of law. (extrinsic(7) below(3) construction(6) presents(5)) | 20 | 21 | 0.13 | −1 | 1 | 0.13 |
| We are not bound by the trial court's interpretation of it, and we therefore proceed, as it is our duty, to determine the effect of its foregoing provisions according to applicable legal principles. *(Estate of Platt (1942) 21 Cal.2d 343, 352 (131 P.2d 825); Jarrett v. Allstate Ins. Co. (1962) 209 Cal.App.2d 804, 809-810 (26 Cal. Rptr. 231); Ziganto v. Taylor (1961) 198 Cal.App.2d 603, 606 (18 Cal. Rptr. 229); Moffatt v. Tight (1941) 44 Cal.App.2d 643, 648 (112 P.2d 910).)* (bound(7) interpretation(8) duty(6) determine(8) provisions(4) according(6) applicable(7) principles(6)) | 33 | 52 | 0.19 | 0 | 0 | 0.19 |
| Appellants contend that the deed in question created a fee simple determinable in the school district with a possibility of reverter in the original grantor, his heirs and assigns. (determinable(8)) | 29 | 8 | 0.04 | 1 | 5 | 0.02 |
| We have concluded that such contention has merit. (concluded(5)) | 8 | 5 | 0.08 | 2 | 6 | 0.03 |

Referring to FIG. 4, step 400 is the step of calculating an initial content score (ICS) for the sentence as the sum of the frequency counts of all content words in the sentence. In the example in Table 2, the only content word in the first sentence is 'instant', whose frequency count (from Appendix A) is 3.

example of Table 2, the distance D of the first sentence is −4, which is entered in the first row of column D of Table 2.

The distance D may be modified according to strategic criteria to provide a more meaningful contribution to the final content score CS that is ultimately calculated.

Sentences that are a greater distance D from the citing instance are initially assumed to be less relevant as reasons for citing. To enhance the meaning of the distance measurement, the invention envisions optional steps that take the absolute value of the distance, and enhance the absolute distance based on one or more strategic criteria. The criteria relate to predetermined statistical observations of the implications of placement of a sentence in the citing document relative to the citing instance. The modification of the raw distance measurement D to arrive at a Modified Absolute Distance (MAD) figure is described with reference to steps 403 and 404.

Block 403 is the step of adding some penalty number, such as 2, to the absolute value of the distance D-if the sentence is not in the paragraph containing the citing instance of X. In the example of Table 2, the first sentence is not in the paragraph containing the citing instance of *Ziganto*, but is in the paragraph before the paragraph of the citing instance. Therefore, MAD, the modified absolute value of its distance D, becomes 6 after step 403 is executed.

Block 404 is the further step of adding another penalty, such as 2, to the MAD—if the sentence is after the citing instance of X. In the example of Table 2, the absolute value of the distance does not change for the first sentence because it is before, not after, the citing instance of *Ziganto*. Thus, in Table 2, MAD remains 6 after step 404.

The invention encompasses means of modifying the distance D to arrive at a modified absolute distance MAD, based on criteria other than the foregoing criteria (whether the sentence of interest is in a different paragraph as the citing instance, or is recited after the citing sentence). Also, the size of the "penalty" may be a value other than 2. Moreover, a number may be subtracted from the absolute distance so as to function, not as a penalty, but as a bonus. Thus, steps 403 and 404 are not only optional, but are exemplary and non-limiting.

Block 405 is the step of calculating the content score CS of the sentences. This calculation may be accomplished in a variety of ways. However, the following way incorporates a balancing of the value of the content word scores (reflected in the value of NICS) and the sentence's distance from the citing instance (reflected in the value of MAD). In this exemplary method of calculating CS:

if MAD>2, CS is calculated by dividing NICS by $MAD^{0.5}$.
if MAD$\leq$2, CS is simply chosen as NICS.

In the first sentence of Table 2, the absolute value of the distance is 6, which is greater than 2. Therefore, its content score CS (rounded to 2 decimal places) is $0.02/6^{0.5}$ or 0.01, which is entered into the CS column in the first row of Table 2.

Block 406 represents the RFC selecting step, in which the one or more sentence(s) with the largest content score(s) are determined to be the RFC. In the example of Table 2, the fifth sentence has the highest content score (0.19). Therefore, if only one sentence is selected, the fifth sentence would be the RFC.

In an alternative embodiment in which more than one sentence is selected as the RFC, the one or more sentences with the next-higher content scores would be selected as the RFC (for example, starting with the fourth sentence of Table 2, which has a CS of 0.13). As a still further alternative, specific sentences may always be included as part of an RFC (for example, the sentence containing the citing instance and/or the sentence immediately before the citing instance's sentence.) Of course, strategies may be combined to form new strategies for selecting the RFC. Thus, the scope of the invention should not be limited to the particular selection criteria described above.

The invention envisions enhancements, improvements, and alternate embodiments of the scoring and selection process in FIG. 4. For example, when the normalized initial content score NICS of every sentence of a context is small, or when the sentence with the highest scoring sentence is far from the citing instance, RFC sentence selection may be improved by one or more of the following techniques.

For example, the invention provides for using a different content word list, or using two or more content word lists generated by different methods (such as the respective methods shown in FIGS. 3A and 3B). When the normalized initial content scores of all sentences are small when using a only one list of content words, the scores may not all be small when using another content word list or when using more than one content word list.

Alternatively, if the sentence with the highest CS is too far from the citing instance, a closer sentence whose score is not as high, but still acceptable, is selected.

The inventive methods having been described above, the invention also encompasses apparatus (especially programmable computers) for carrying out the methods. Further, the invention encompasses articles of manufacture, specifically, computer-readable memory on which computer-readable code embodying the methods may be stored, so that, when the code is used in conjunction with a computer, the computer can carry out the methods.

A non-limiting, illustrative example of an apparatus that the invention envisions is described above and illustrated in FIG. 1. The apparatus may constitute a computer or other programmable apparatus whose actions are directed by a computer program or other software.

Non-limiting, illustrative articles of manufacture (storage media with executable code) may include the disk memory 103 (FIG. 1), other magnetic disks, optical disks, "flash" memories, conventional 3.5-inch, 1.44 MB "floppy" diskettes, "ZIP" disks or other magnetic diskettes, magnetic tapes, and the like. Each constitutes a computer readable memory that can be used to direct the computer to function in a particular manner when used by the computer.

Those skilled in the art, given the preceding description of the inventive methods, are readily capable of using knowledge of hardware, of operating systems and software platforms, of programming languages, and of storage media, to make and use apparatus for carrying out the foregoing methods, as well as computer readable memory articles of manufacture that can be used in conjunction with a computer to carry out the inventive methods. Thus, the invention's scope includes not only the methods themselves, but related apparatus and articles of manufacture.

APPENDICES

Concerning the content of the following Appendices, see the copyright notice at the beginning of the specification.

Appendix A—List of "Content Words" generated by the method in FIG. 3A

Appendix B—List of "Content Words" generated by the method in FIG. 3B

Appendix C—List of "Noise Words"

APPENDIX A

List of "Content Words" and respective frequency counts generated by the method of FIG. 3A

| | |
|---|---|
| 3 | absence |
| 5 | accept |

APPENDIX A-continued

List of "Content Words" and respective frequency counts generated by the method of FIG. 3A

| Count | Word |
|---|---|
| 5 | accepted |
| 6 | accordance |
| 6 | accorded |
| 6 | according |
| 2 | added |
| 2 | administrative |
| 2 | administratively |
| 2 | adopted |
| 2 | adoption |
| 2 | agency |
| 2 | agreement |
| 4 | aid |
| 7 | applicability |
| 7 | applicable |
| 7 | application |
| 2 | april |
| 2 | august |
| 3 | based |
| 2 | basis |
| 2 | begun |
| 3 | below |
| 7 | bound |
| 2 | calculating |
| 2 | child |
| 2 | civil |
| 4 | commenced |
| 4 | commencement |
| 4 | commences |
| 4 | commencing |
| 7 | computation |
| 7 | computed |
| 7 | computing |
| 5 | conclude |
| 5 | concluded |
| 5 | conclusion |
| 5 | conclusions |
| 2 | conflict |
| 2 | conflicting |
| 2 | conflicts |
| 2 | consent |
| 4 | consider |
| 4 | consideration |
| 4 | considered |
| 2 | constitute |
| 2 | constituted |
| 6 | construction |
| 6 | constructions |
| 3 | contract |
| 2 | count |
| 6 | date |
| 8 | day |
| 8 | determination |
| 8 | determine |
| 8 | determining |
| 2 | drawn |
| 2 | during |
| 6 | duty |
| 3 | erroneous |
| 2 | establish |
| 2 | established |
| 2 | establishes |
| 4 | event |
| 7 | exclude |
| 7 | excluded |
| 7 | excludes |
| 7 | excluding |
| 2 | expiration |
| 7 | extrinsic |
| 4 | february |
| 4 | final |
| 2 | findings |
| 4 | first |
| 2 | fn |
| 4 | followed |
| 4 | following |
| 3 | footnotes |

APPENDIX A-continued

List of "Content Words" and respective frequency counts generated by the method of FIG. 3A

| Count | Word |
|---|---|
| 3 | generally |
| 2 | given |
| 2 | haley |
| 2 | hand |
| 2 | holiday |
| 3 | identical |
| 2 | inferences |
| 2 | inquiry |
| 3 | instant |
| 2 | instrument |
| 8 | interpretation |
| 8 | interpretations |
| 8 | interpreted |
| 2 | introduced |
| 3 | issue |
| 2 | italics |
| 2 | language |
| 2 | legal |
| 2 | likewise |
| 4 | made |
| 5 | make |
| 3 | making |
| 3 | meaning |
| 3 | month |
| 2 | months |
| 2 | omitted |
| 2 | order |
| 7 | period |
| 2 | plain |
| 5 | present |
| 5 | presented |
| 5 | presents |
| 6 | principles |
| 2 | procedure |
| 5 | provide |
| 5 | provided |
| 5 | provides |
| 4 | provision |
| 4 | provisions |
| 2 | refused |
| 2 | release |
| 2 | released |
| 2 | resort |
| 2 | resorted |
| 2 | respect |
| 2 | respectively |
| 2 | respondents |
| 3 | six |
| 2 | stated |
| 2 | support |
| 2 | supported |
| 6 | terms |
| 2 | then |
| 2 | therefrom |
| 2 | thus |
| 7 | time |
| 2 | unless |
| 2 | urges |
| 3 | written |

APPENDIX B

List of "Content Words" and respective frequency counts generated by the method of FIG. 3B

| Count | Word |
|---|---|
| 2 | above |
| 6 | accordance |
| 6 | accorded |
| 6 | according |
| 2 | added |
| 3 | agreement |
| 2 | allegation |
| 2 | allegations |

APPENDIX B-continued

List of "Content Words" and respective frequency counts generated by the method of FIG. 3B

| | |
|---|---|
| 3 | april |
| 2 | argument |
| 3 | august |
| 2 | between |
| 2 | certain |
| 3 | civil |
| 2 | claim |
| 2 | claimed |
| 4 | commenced |
| 4 | commencement |
| 4 | commences |
| 2 | complained |
| 2 | complaint |
| 2 | computation |
| 2 | computed |
| 6 | conclude |
| 6 | concluded |
| 6 | conclusion |
| 6 | conclusions |
| 5 | construction |
| 5 | constructions |
| 2 | contained |
| 2 | contains |
| 2 | continued |
| 2 | continuously |
| 3 | contract |
| 3 | contractor |
| 7 | date |
| 9 | day |
| 2 | days |
| 2 | decision |
| 2 | decisions |
| 4 | determination |
| 4 | determine |
| 4 | determined |
| 4 | determining |
| 2 | entered |
| 5 | event |
| 2 | excluded |
| 2 | excludes |
| 2 | excluding |
| 2 | executed |
| 2 | execution |
| 3 | expiration |
| 3 | first |
| 5 | followed |
| 5 | following |
| 3 | given |
| 2 | include |
| 2 | instrument |
| 2 | issues |
| 3 | language |
| 2 | mentioned |
| 2 | necessarily |
| 2 | necessary |
| 2 | new |
| 2 | order |
| 2 | parties |
| 8 | period |
| 3 | present |
| 3 | presented |
| 3 | procedure |
| 2 | properly |
| 2 | property |
| 6 | provide |
| 6 | provided |
| 6 | provides |
| 6 | providing |
| 3 | provision |
| 3 | provisions |
| 2 | reasonable |
| 2 | request |
| 2 | requested |
| 3 | respondent |
| 3 | respondents |
| 2 | same |

APPENDIX B-continued

List of "Content Words" and respective frequency counts generated by the method of FIG. 3B

| | |
|---|---|
| 2 | stipulated |
| 2 | stipulation |
| 3 | terms |
| 3 | then |
| 2 | thereof |
| 8 | time |
| 3 | unless |
| 2 | used |
| 3 | written |
| 2 | *ziganto* |

APPENDIX C

List of "Noise Words"

a
about
accordingly
act
acts
after
again
against
ago
all
already
also
although
am
among
an
and
another
any
app
appeal
appellant
appellants
appellate
appellee
appellees
appropriate
appropriately
are
argue
argued
as
at
away
be
became
because
been
before
both
but
by
cal
can
cannot
case
cases
cf
ch
chicago
citation
citations
cite
cited
civ
co
code
could APPENDIX C-continued List of "Noise Words"

court
courts
defendant
defendants
did
district
do
doc
does
done
down
each
end
enough
erred
error
even
ever
evidence
existing
fact
facts
few
fewer
filed
footnote
footnotes
for
from
general
good
had
has
have
he
held
her
here
him
his
how
I
if
ill
in
including
into
is
it
its
itself
judge
judgment
just
last
later
law
laws
less
like
many
may
me
mere
merely
might
more
moreover
most
much
must
my
near
nevertheless
no
not
now APPENDIX C-continued List of "Noise Words"

nv
of
on
once
one
only
or
other
others
otherwise
our
ours
out
over
own
par
penal
per
petition
petitioned
petitioner
petitioners
plaintiff
plaintiffs
pp
probably
proceeding
proper
pursuant
question
questioned
rely
rev
right
rights
rule
rules
ruling
said
say
says
section
see
set
shall
she
should
so
some
stat
state
statute
still
subdivision
subsection
such
supra
th
than
that
the
their
theirs
them
there
therefore
these
they
this
those
though
to
told
too
toward
towards
trial

APPENDIX C-continued

List of "Noise Words"

under
up
upon
us
use
very
was
way
we
well
were
what
when
where
whether
which
while
who
wholly
whom
whose
will
with
within
without
would
yet
you
your Modifications and variations of the above-described embodiments of the present invention are possible, as appreciated by those skilled in the art in light of the above teachings. For example, the particular programming language used, the hardware platform on which the inventions are executed, the medium on which the executable code is recorded, the particular method of generating a word list, the particular method of scoring sentences, the particular method of selecting the reasons for citing based on scores, the particular method of calculating or enhancing any of the various scores used in the methods, the particular values of parameters and criteria used during execution of the methods, and the like, may be varied by those skilled in the art while still remaining within the scope of the invention. It is therefore to be understood that, within the scope of the appended claims and their equivalents, the invention may be practiced otherwise than as specifically described.

What is claimed is:

1. An automated method of scoring sentences in citing documents, to indicate relevance of content of the respective sentences to reasons that a cited document is cited, the method comprising:
    calculating respective initial content scores (ICSs) for the sentences in the citing documents, based on the content of the sentences;
    calculating respective distances (Ds) of the sentences in the citing documents from respective citing instances of the cited document; and
    calculating respective content scores (CSs) for the sentences in the citing documents, based on at least the ICSs and the distances.

2. The method of claim 1, further comprising normalizing the ICSs to form normalized initial content scores (NICSs) for use by the CS calculation step, by taking into account:
    a) numbers of words in the respective sentences; and
    b) a largest frequency count in a content word list that includes:
        1) a set of content words that are found in the sentences of the citing documents, and
        2) a set of frequency counts linked to corresponding content words in the set of content words.

3. The method of claim 1, further comprising:
    modifying the distances D to norm respective modified absolute distances (MADs) for use by the CS calculation step, based on criteria relating to predetermined statistical observations of the implications of placement of a sentence in the citing document relative to the citing instance.

4. The method of claim 3, wherein the criteria include: whether the sentence is in the same paragraph as the citing instance.

5. The method of claim 3, wherein the criteria include: whether the sentence is located after the citing instance.

6. An apparatus of scoring sentences in citing documents, to indicate relevance of content of the respective sentences to reasons that a cited document is cited, the apparatus comprising:
    means for calculating respective initial content scores (ICSs) for the sentences in the citing documents, based on the content of the sentences;
    means for calculating respective distances (Ds) of the sentences in the citing documents from respective citing instances of the cited document; and
    means for calculating respective content scores (CSs) for the sentences in the citing documents, based on at least the ICSs and the distances.

7. The apparatus of claim 6, further comprising means for normalizing the ICSs to form normalized initial content scores (NICSs) for use by the CS calculation means, by taking into account:
    a) numbers of words in the respective sentences, and
    b) a largest frequency count in a content word list that includes:
        1) a set of content words that are found in the sentences of the citing documents, and
        2) a set of frequency counts linked to corresponding content words in the set of content words.

8. The apparatus of claim 6, further comprising:
    means for modifying the distances D to form respective modified absolute distances (MADs) for use by the CS calculation means, based on criteria relating to predetermined statistical observations of the implications of placement of a sentence in the citing document relative to the citing instance.

9. The apparatus of claim 8, wherein the criteria include: whether the sentence is in the same paragraph as the citing instance.

10. The apparatus of claim 8, wherein the criteria include: whether the sentence is located after the citing instance.

11. A computer-readable memory that, when used in conjunction with a computer, can carry out an automated method of scoring sentences in citing documents, to indicate relevance of content of the respective sentences to reasons that a cited document is cited, the computer-readable memory comprising:
    computer-readable code for calculating respective initial content scores (ICSs) for the sentences in the citing documents, based on the content of the sentences;
    computer-readable code for calculating respective distances (Ds) of the sentences in the citing documents from respective citing instances of the cited document; and computer-readable code for calculating respective content scores (CSs) for the sentences in the citing documents, based on at least the ICSs and the distances.

12. The computer-readable memory of claim 11, further comprising computer-readable code for normalizing the ICSs to form normalized initial content scores (NICSs) for use by the CS calculation computer-readable code, by taking into account:
- a) numbers of words in the respective sentences, and
- b) a largest frequency count in a content word list that includes:
   1) a set of content words that are found in the sentences of the citing documents, and
   2) a set of frequency counts linked to corresponding content words in the set of content words.

13. The computer-readable memory of claim 11, further comprising:
computer-readable code for modifying the distances D to form respective modified absolute distances (MADs) for use by the CS calculation computer-readable code, based on criteria relating to predetermined statistical observations of the implications of placement of a sentence in the citing document relative to the citing instance.

14. The computer-readable memory of claim 13, wherein the criteria include:
whether the sentence is in the same paragraph as the citing instance.

15. The computer-readable memory of claim 13, wherein the criteria include:
whether the sentence is located after the citing instance.

* * * * *